US 6,640,297 B1

(12) United States Patent
Banning et al.

(10) Patent No.: US 6,640,297 B1
(45) Date of Patent: Oct. 28, 2003

(54) LINK PIPE SYSTEM FOR STORAGE AND RETRIEVAL OF SEQUENCES OF BRANCH ADDRESSES

(75) Inventors: John Banning, Sunnyvale, CA (US); Brett Coon, Milpitas, CA (US); Eric Hao, Cupertino, CA (US)

(73) Assignee: Transmeta Corporation, Santa Clara, CA (US)

( * ) Notice: Subject to any disclaimer, the term of this patent is extended or adjusted under 35 U.S.C. 154(b) by 642 days.

(21) Appl. No.: 09/596,280

(22) Filed: Jun. 19, 2000

(51) Int. Cl.[7] .............................................. G06F 9/38
(52) U.S. Cl. ...................................... 712/238
(58) Field of Search ............................... 712/237, 238, 712/240

(56) References Cited

U.S. PATENT DOCUMENTS

| | | | | |
|---|---|---|---|---|
| 5,557,733 A | * | 9/1996 | Hicok et al. .................. 345/554 |
| 5,587,953 A | * | 12/1996 | Chung .......................... 365/220 |
| 5,931,944 A | * | 8/1999 | Ginosar et al. ............. 712/239 |
| 5,956,748 A | * | 9/1999 | New ............................ 711/149 |
| 6,205,544 B1 | * | 3/2001 | Mills et al. .................. 712/230 |
| 6,243,805 B1 | * | 6/2001 | Mahurin ...................... 712/233 |
| 6,279,106 B1 | * | 8/2001 | Roberts ....................... 712/239 |
| 6,502,185 B1 | * | 12/2002 | Keller et al. ................ 712/213 |

* cited by examiner

Primary Examiner—William M. Treat
(74) Attorney, Agent, or Firm—Wagner, Murabito & Hao LLP

(57) ABSTRACT

The speed of processing of a sequence of indirect branch instructions in a pipelined processor is increased by overlapping the latencies in the sequence of indirect branch instructions. The architecture of a digital processor is modified to include a link pipe system that allows the sequence of branch addresses required by the indirect branches to be written to a single location within the processor, and to be read from a single location in the processor. The link pipe system contains a plurality of registers (3, 5 & 7) for storage of respective branch target addresses. Each WRITE of a branch address is automatically directed (9) to individual registers within the link pipe system for storing the respective branch addresses; and each READ of a branch address is automatically directed (11) to the register containing the earliest WRITE of an address that was not previously read by the processor, whereby branch target addresses are retrieved on a "first in, first out" basis.

19 Claims, 2 Drawing Sheets

LINK PIPE SYSTEM FOR STORAGE AND RETRIEVAL OF SEQUENCES OF BRANCH ADDRESSES

FIELD OF THE INVENTION

This invention relates to digital processors and, more particularly, to a novel method and apparatus for increasing the speed of execution of a sequence of indirect branches by permitting the latencies between the identification of the indirect branch targets and the execution of the indirect branch instructions to be overlapped.

BACKGROUND

One of the important known techniques for effectively improving processor performance is the use of an execution pipeline through which instructions are "pipelined" for execution. In that technique, the execution of each instruction is separated or broken into multiple sub-steps, and those sub-steps are performed (e.g. processed) in an overlapping "stair step" manner. The pipelining technique works well for sequential execution of instructions. A recognized difficulty, however, is how to maintain the overlap of the sub-steps in the presence of instructions, such as branches, which are able to alter the flow of control of the processing. When the flow of control changes unexpectedly, the future instruction sub-steps which have and are being performed in the pipeline must be voided and the pipeline restarted at the new execution address. The time taken to make that changeover generally detracts from the execution efficiency of the program being processed and is often referred to as a pipeline or branch "bubble".

Typically, branch bubbles are addressed by identifying or, more specifically, attempting to identify branch instructions early, that is, in the earliest stage or stages of the instruction pipeline. When the branch and branch target address can be identified early enough, pipelining can be started beginning at the branch target. Should the branch then be taken, the branch bubble is thereby reduced or, possibly, eliminated.

For a large class of branches, often referred to as direct branches, the branch target address is embedded in the branch instruction either as a direct address or as an offset relative to the address of the branch instruction. For the foregoing class of branches, early identification of both the branch instruction and the branch target in the pipeline process is relatively easy of accomplishment by the pipelining mechanism. The pipelining mechanism is thus able to initiate procedures which reduce or eliminate pipeline bubbles.

For another important class of branches, often referred to as indirect branches, the branch target address is not embedded in the branch instruction but is located in a register within the processor. Such a branch presents a greater difficulty for the pipelining mechanism. Although the pipeline mechanism is able to identify the branch instruction early, which would also identify which register holds the target address, the pipeline mechanism is unable to correctly identify the target address. The reason for that inability is that the value that is contained in the identified register (e.g. a branch address) could be changed during the interval between the time when the initial identification was made of the assertion of the branch instruction and the time, shortly thereafter, when the branch instruction actually reaches the execution stage of the pipeline. As a consequence on many processors indirect branches always cause the maximum length of branch bubble, increasing the processing time for instruction execution.

A partial solution to the foregoing problem was to trigger the pipelining of indirect branch target instruction, not on the identification of the indirect branch instruction in the pipeline, but, instead, on the writing of a branch target address to a special branch target address register. This technique may be implemented with one or more of such branch target registers and has proven effective in many classes of computation.

However, there are some important classes of computation, notably interpreters, whose heavy and stylized use of indirect branch instructions continues to result in excessive performance-limiting branch bubbles during processing of a program. In these cases, there is a need to execute a sequence of indirect branches with few intervening branch instructions.

An interpreter typically contains a main loop which fetches an instruction, breaks the instruction into pieces and performs subroutine calls or jumps to perform the actions specified by the pieces. As an example, assume an interpreter that handles a sixteen bit instruction set, such that a typical instruction is of the form: [opcode-7 bits] [operand reg1-3 bits] [operand reg2-3 bits] [result reg-3 bits]. One instruction might be to "add r1, r2, r3".

The interpreter would fetch the full sixteen bit instruction, break the instruction into the four pieces, above bracketed and then use the opcode field to select the address of the "add" handling code from a code pointer table. Then the interpreter would take an indirect branch to that code. The "add" handling code could then use the operand fields to select subroutine addresses to fetch the values of reg1 and reg2; then execute those subroutines using indirect branches or calls; and then perform the add. Finally, the interpreter would use the result register field to select a subroutine to effect a store of the (reg1+reg2) value into the result register. The foregoing results in a good number of indirect branches with few intervening instructions. In other words the register fetch and register store subroutines or code sections may be only one or two instructions in length.

Although the foregoing processing technique for the interpreter allows overlapping of the indirect branch latency with the execution of the intervening non-indirect branch instructions, it is not possible to overlap the latencies of the indirect branch instructions with respect to each other in processor systems containing a single branch target register; and it is very difficult to overlap those latencies in those processing systems that contain multiple directly-addressed branch target registers.

As an advantage, the present invention introduces a system and method of permitting the overlapping of indirect branch latencies with respect to each other, effectively speeding up processing of application programs.

Accordingly, an object of the invention is to increase the processing speed of a digital processor.

Another object of the invention is to permit an overlap of the latencies between the identification of the indirect branch targets and the execution of the indirect branch instructions in a sequence of indirect branch instructions.

SUMMARY

In accordance with the foregoing objects and advantages, a computer implemented method for increasing the speed of processing of a code sequence containing two or more indirect branches comprises the writing of target branch addresses for a sequence of indirect branch instructions to a single storage address; and reading those target branch addresses from another storage address in the same sequence earlier written. The respective writes and reads of the target branch addresses are accomplished on a first-in, first-out basis. Accordingly, in a pipelined processing system separate branch instructions in a sequence may retrieve the associated branch addresses in the same sequence, incrementally spaced apart in time, permitting the respective branch instructions to be processed in overlapped relationship, and thereby expedite processing of the program associated with such branch instructions.

A digital processor constructed in accordance with the present invention employs (or reserves) a series of registers, defining or termed a link pipe for temporarily storing branch addresses, a first pointer circuit, called a head pointer, that points the processor to successive different registers in the link pipe when the processor is to write, store, multiple branch instruction addresses; and a second pointer circuit, defining or termed a tail pointer, that points the processor to successive registers in the link pipe when the processor is to read, retrieve, multiple branch instruction addresses.

Further, in accordance with the invention, upon completion of a write to the link pipe (as specified in a program authored by a software engineer), the head pointer circuit automatically points to the next register in the series, whereby the link pipe system is prepared for the write of another branch address by the processor; and, upon completion of a read of the link pipe (accomplished implicitly when the program specifies an indirect branch), the tail pointer circuit points to the next register in the series in preparation for subsequent indirect branches by (and consequent read operation of) the processor. The head and tail pointers are assigned unique locations by the computer designer. To write a branch target address to the link pipe the software engineer specifies that unique location (address) of the head pointer in the subroutine for loading the target address. To read a branch target address from the link pipe, the software engineer specifies an indirect branch to the unique location for the tail pointer in a subroutine, the effect of which is that the processor reads the information at that location.

In accordance with a further aspect to the invention, the respective pointer circuits are designed to recycle through the series of registers as the number of branch addresses, respectively, written into the link pipe (and read) by the processor exceeds the number of link pipe registers in the series By overlapping latencies between loading the branch registers and branching, the hardware increases processing speed of those software applications that employ significant branching, enhancing processor performance.

The foregoing and additional objects and advantages of the invention together with the structure characteristic thereof, which was only briefly summarized in the foregoing passages, will become more apparent to those skilled in the art upon reading the detailed description of a preferred embodiment of the invention, which follows in this specification, taken together with the illustrations thereof presented in the accompanying drawings.

DETAILED DESCRIPTION OF THE PREFERRED EMBODIMENTS

Figure 1:
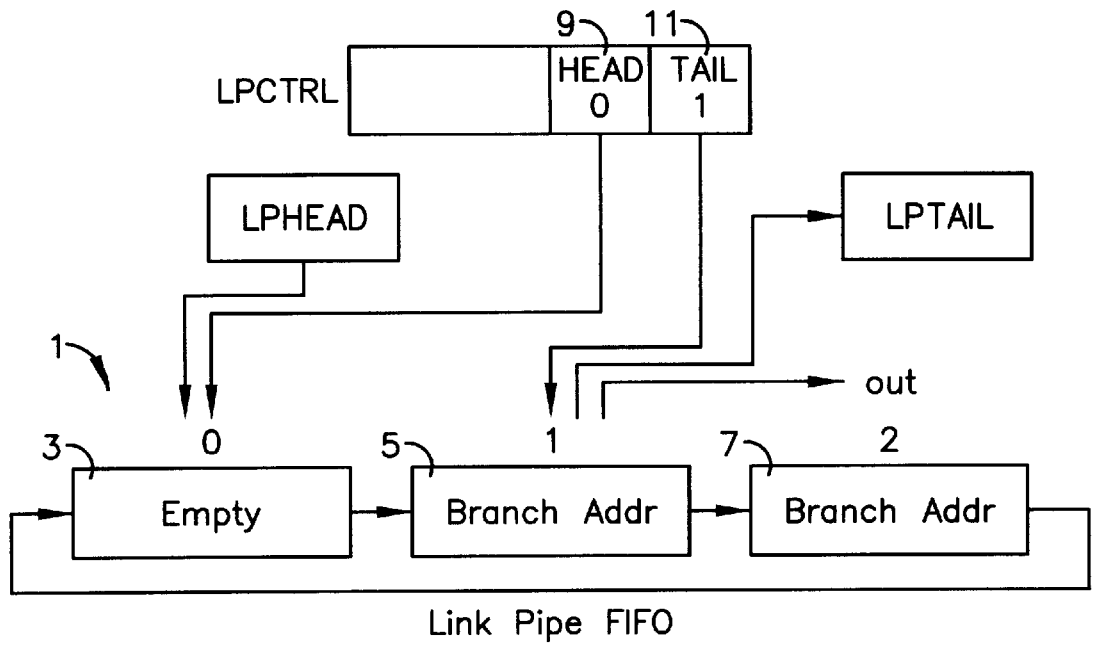
FIG. 1 illustrates an embodiment of the invention in a diagrammatic form.
Figure 2:
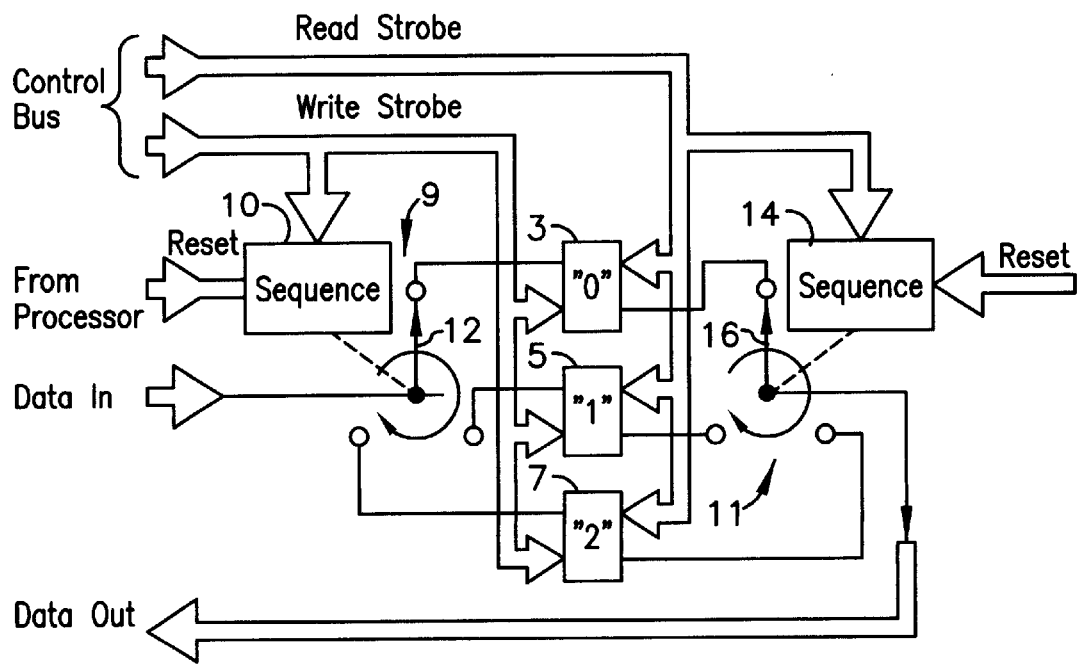
FIG. 2 is a block diagram of the embodiment of FIG. 1.

Reference is made to the embodiment of the invention presented in FIG. 1 which illustrates the Link Pipe system in diagrammatic form familiar to software engineers and the functional diagram of FIG. 2, which may be considered together. Referring to FIG. 1, the link pipe 1 contains a series of registers 3, 5 and 7, a head pointer 9, and a tail pointer 11. Each register is of a size wide enough to hold the digital information of a branch address for the processor, as example, is 24-bits wide. As becomes apparent, the link pipe forms a novel type of "first-in first out" register ("FIFO") for writing and reading of branch target addresses.

When the processor asserts a WRITE of a branch address to the link pipe system, the head pointer 9 points to the register to which the WRITE is made of that branch address. Once the WRITE is completed, the pointer is automatically advanced to the next available register in the link pipe. Arrow 9a represents the register location being pointed to. The direction of movement of the head pointer position is represented in the figure by the arrows through the registers 3, 5 and 7. As represented by those arrows with each WRITE the automatic pointer sequentially changes in position from one register to another in a clockwise manner about the three registers of the link pipe and recycles in that manner through the link pipe as the number of such WRITES exceeds the number of registers forming the link pipe.

Likewise, when the processor asserts a READ of a branch address in the link pipe, the tail pointer 11 points to the register in which the READ is made of the branch address. Arrow 11a represents a register location being pointed to by the tail pointer, as an example, but which could be any of the registers. Once the READ completes, the tail pointer automatically "moves" to the next available register in the link pipe. That change of position also occurs in a clockwise manner in a circular path about the registers of the link pipe, recycling through the link pipe as the number of READS exceeds the number of registers in the link pipe.

The foregoing sequencing is better illustrated in FIG. 2 to which reference is made. Head pointer 9 includes a sequencing device 10, which includes a switch that is stepped in sequential order between registers 3, 5 and 7, as represented symbolically by the rotatable stepper contact 12. The sequencing device is able to detect the termination of a read pulse, the tail end of the pulse. A WRITE is made to the register to which switch 12 is connected, writing the data available on the data bus into the register. Each time a WRITE strobe completes, the sequencing device 6 moves the positionable output, containing the branch address, to the next register in the series. Thus the head pointer points to the next register of the link pipe that will next receive a branch address.

Tail pointer 11, likewise contains a sequencing device 14, which includes an electronic switch that is stepped in sequential order between registers 3, 5 and 7, as represented symbolically by the rotatable stepper contact 16. A READ is made to. the register to which switch 16 is connected, applying the output of the register to the data bus. The sequencing circuit 14 is able to detect the completion of a READ strobe pulse, the tail end of that pulse. Each time a READ strobe completes, the sequencing device 14 moves the positionable output to the output of the next register in the series.

Returning to FIG. 1, a target of an instruction that the processor executes to access the link pipe system and perform a WRITE of a branch address is represented in the figure by the box labeled LPHEAD. That target of an instruction, such as an indirect branch instruction, which the processor executes to access the link pipe system and perform a READ of a branch address stored in the register is represented by the box labeled LPTAIL. Those are exemplary mnemonic designations for the software engineer to use, and those boxes represent software, not hardware. With either reading or writing, only the link pipe system is accessed by the processor, and the processor does not address any particular register within the link pipe system to assert a READ or WRITE. The register location of the write is assigned by head pointer 9 automatically, and the register location of the read is automatically assigned by tail pointer 11.

As a clarification, it should be noted that the head and tail pointers 9 and 11 are not "pointers" in the traditional sense as that term is used in software programming, typically an address in a register that directs the processor to another register to retrieve another address. Instead those designations represent the functions carried out in the hardware of the system (the electronic circuits more specifically described in connection with FIG. 3, hereafter) of directing or pointing the processor (sic the program being run on the processor) to the next available location in the link pipe for a respective WRITE of a branch address or a READ of a branch address. Moreover, those familiar with FIFO'S should not be confused by the fact the digital information is written into the link pipe at the "head" of the pipe and is "read" at the tail, which is the opposite of the writing and reading of a conventional FIFO.

In operation and following initialization of the link pipe, later herein described, both the head and the tail pointers (registers) point to the same register of the link pipe, which, for purposes of this description may be (but is not required to be) the first ("0") register in the link pipe. The fact that both pointers point to the same location means that the link pipe has not as of that stage of operation been written to with any target addresses. Notwithstanding, it may be noted that those registers of the link pipe could contain digital information, which may be referred to as "garbage". It will be understood from an understanding of the operation of the system that the existence of any such garbage has no adverse affect on the operation of the link pipe system. The garbage will be overwritten or replaced by the addresses of the WRITE operations.

Assume first that a section of code being executed by the processor that contains three indirect branches with few or no intervening non-branch instructions, and that the indirect branches require three "target" addresses in sequential order. The target addresses are obtained by the program in the conventional manner, not here described, and each address is written in sequence to the location in the link pipe that is pointed to by the head pointer, which is a variable. After each WRITE the head pointer points to the next available location (register) in the link pipe in which to place the next WRITE of a branch address, if any.

Assuming that both head and tail pointers point to register 3, the "0" register, the WRITE of the first target address is made into register 3, and, concurrently with completion of that write, head pointer 9 is automatically incremented by one, so that the pointer then points to register 5, the "1". register. The processor WRITES the next target address to the register that is activated by the head pointer, register 5. Concurrently with completion of the forgoing second WRITE, head pointer 9 is automatically incremented again by one, so that the pointer then points to a third register 7 of the link pipe, the "2" register. The processor WRITES the third target address to the register of link pipe 1 that is pointed to (sic activated) by head pointer 9, register 7. Concurrently with completion of that WRITE, the head pointer is automatically incremented again by one, so that the pointer then again points to register 3, the "0" register.

With the three branch addresses now stored in the link pipe, the processor next secures the first branch target address in order to execute the branch instruction by a READ of the information from the register of the link pipe that is pointed to (sic activated for the READ) by the tail pointer 11. In accordance with the assumptions initially made, that is register 3 (the "0" register). Upon completion of the READ of register 3, the tail pointer is automatically incremented by one in position so as to point to register 5 (the "1" register). Note that the address that is first read is the first address that was written to the link pipe, ie, a first in, first out procedure for the addresses.

Securing the first target address, the execution continues after the branch instruction, and, eventually, another branch instruction is executed that requires a second target address. In accordance with the processing of the instruction, the processor asserts a READ of the register pointed to by tail pointer 11, which is now positioned at register 5 (the "1" register), the second register in the link pipe, where the second target address was previously stored. Upon conclusion of the READ, the tail pointer is again automatically incremented in position so as to point to register 7 (the "2" register), where the third target address is stored.

Securing the second target address, the branch instruction continues to be processed, and, eventually, the processor requires the third (and final) target address that was stored earlier in the link pipe. In accordance with the processing of the branch instruction, the processor asserts a READ of the link pipe register that is pointed to by tail pointer 11, which is register 7. Upon completion of that READ, the tail pointer is again automatically incremented by one in position so as to point again to register 3, the "0" register, where the first target address remains stored. At this stage of the operation, it should be noted that both the head and tail pointers, 9 and 11, point to register 3 (the "0" register); and that the addresses were read out in the same order in which those addresses were written into the link pipe registers.

As further example, assume next, a different branch instruction that requires only two target addresses is being processed by the processor. As in the preceding description, the head pointer points to register 3, and the processor WRITES the first branch address in that register, overwriting (replacing) the branch address written in that location during the operations earlier described. Upon completion of the write operation, the head pointer is automatically repositioned and points to the second register in the link pipe, register 5 (the "1") register, and the processor asserts a WRITE of the second branch address to that register. Upon completion of the write operation, head pointer 9 is again automatically incremented and points to register 7, the "2" register which is the third register of link pipe 1. Tail pointer 11, meanwhile, remains pointing to register 3, the first register of the link pipe.

When executing the branch instruction the processor initiates a READ of the first target address, the READ is made of the first register 3. Upon completion of the read operation, the tail pointer is incremented to point to the second register 5. In processing of the branch instruction, a branch is made to the address that was read from register 3 and execution continues at that address. The details of a branch instruction, branching, and execution of the branch instruction by the processor is well understood by those skilled in the art and not here explained. In accordance with the assumptions, the processor requires the second target address in order to execute the branch instruction. The processor asserts the next READ of link pipe 1 and is directed by the tail pointer to register 5, which is then read. Upon completion of the READ, the tail pointer is incremented to point to register 7, the "2" register.

The processor completes execution of the branch instruction, the details of which are not relevant nor material to an understanding of the present invention and is not described. Although the foregoing description described a number of stores of target addresses in the link pipe followed by a number of reads thereof for ease of understanding, it should be understood that the apparatus is not limited to that order. Thus, for example, a store may be followed by a read, followed by another store, and then another read. Or two stores may be followed by one read, another store, and then followed by two reads. Or three stores may be followed by one read, then another store, another read, another store. Because of the circular nature of the link pipe, any of the foregoing action is permitted.

Pointers 9 and 11 may each be written to and read by the processor. Thus to initialize the link pipe, the processor preferably positions both the pointers to point to the first register in link pipe 1, register 3. However, as is apparent from the foregoing description, the processor may point both pointers to any register in the link pipe.

The foregoing concludes the description of operation of the retrieval of two target addresses required for execution of a pair of branch instructions. Following the foregoing operation, both the head and tail pointers are pointing to register 7, the "2" register. Thus register 7 effectively becomes the new base or zero position into which the first target address of a succeeding branch instruction is to be written when the branch instruction is encountered during subsequent processing of the program. Thus for example assume that another pair of branch instructions require addresses in squence. In brief, the processor writes those addresses in sequence into register 7 (the "2" register) and 3 (the "0" register) of the link pipe, respectively which are pointed to in that sequential order by head pointer 9. With the READS of the link pipe that later follow, the first READ is of register 7 (pointed to by tail pointer 11) and the next READ is of register 3 (next pointed to by tail pointer 11). At the completion of the READS, both pointers are pointing to register 5 (the "1" register).

In effect the hardware possesses a quality found in the first-in first-out ("FIFO") registers, in which multiple words of digital data that are input to the FIFO register in sequence in a serial order and the first word of that sequence is the first word that is output, as the words are paraded or stepped through the FIFO register.

A distinct benefit of the invention is that the foregoing hardware is transparent to the software engineer (sic programmer) who authors the software for the processor. When the software engineer's program is to write of a branch address to a branch register, the engineer employs a code, such as LPHEAD, which represents a fictional register of the processor. In executing the instruction of the WRITE to LPHEAD, the processor writes the information to the particular register in the link pipe that is pointed to by the head pointer. Likewise when the branch address is to be read, the software engineer employs another code in the instruction, such as LPTAIL, which represents another fictional register. The processor interprets the mnemonic LPTAIL as branching to the address in the register of the link pipe that is pointed to by the tail pointer. In authoring the program containing the branch instructions, the software engineer may specify numerous branch address (and branches), but is only required to specify the same fictional addresses (pseudo-name) for the branch address register (and branch), irrespective of the number of branch addresses involved in an instruction. As is apparent, that simplifies the writing of the software as the programmer is not required to track different branch registers.

Figure 3:
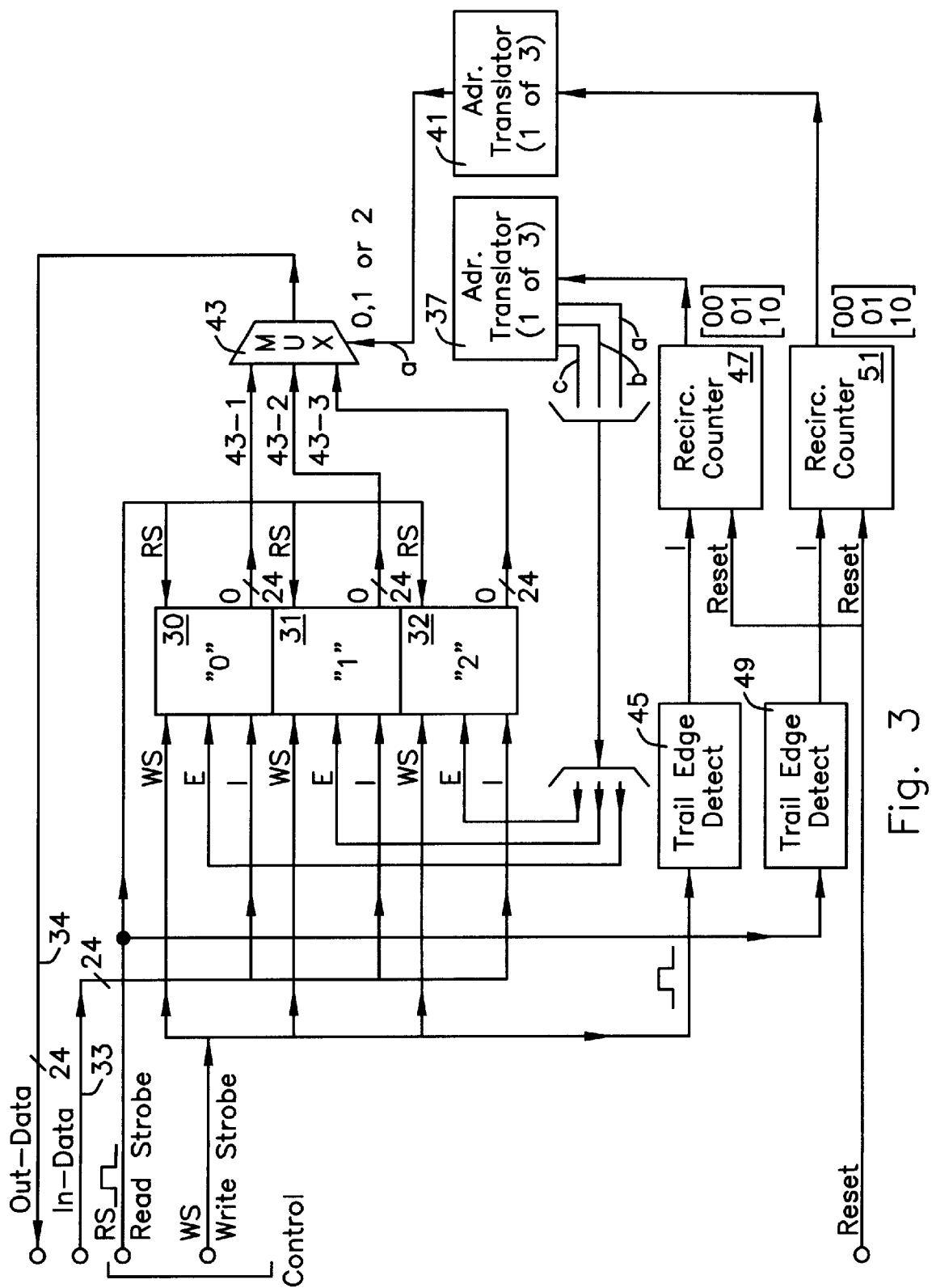
FIG. 3 is a schematic illustration of the embodiment of FIG. 1.

The addresses (data) written into the registers of the link pipe are not erased on conclusion of a branch instruction. That digital information remains in the link pipe until overwritten (replaced) by a succeeding target address. The preferred hardware to implement the foregoing system is illustrated in FIG. 3 to which reference is made. The individual registers 30, 31 and 32 that form the link pipe are of conventional structure and are sufficient in size to hold the number of bits in the address required to be stored, as example, twenty-four bits. The data input of each of those registers is represented by an I (sic "input"), the output by "O", the write strobe input "WS" and the read strobe "RS" and an enable control input labeled "E". The 24-bit address (data) that is presented by the processor on data bus 33 is written into a link pipe register only if the control input E of that register is active when the processor, not illustrated, produces a write strobe appears at strobe inputs WS.

The selection of a particular register of the link pipe in which to write (and temporarily store) a branch address is the function of the head pointer, as was earlier described. The head pointer circuit is formed of the trailing edge detector 45, recirculating counter 45 and the associated address translator 37. In this embodiment the permissible outputs of the recirculating counter, which are the addresses for the three link pipe registers in the preferred embodiment are each two bits in length, either binary "00", "01" or "10". Translator 37 comprises ordinary logic gates that translate the two bit address into a voltage high, as example, on one of the three output lines 37a, b and c, the selection lines. When the link pipe is initialized during initialization of the processor, as later herein described, the address output from counter 47 is that of link pipe register 30. Hence via selection line 37a of address translator 37 the head pointer circuit initially "points to" link pipe register 30. Thus, data (address) that the processor applies on line 33 to the I input of link pipe registers 30, 31 and 32 when, following initialization, the first branch address is to be stored is written only into link pipe register 30.

The selection of a particular register of the link pipe from which to read a stored branch address is the function of the tail pointer, as earlier described. The tail pointer circuit is formed of a second trailing edge detector 49, recirculating counter 51, an associated address translator 41 and a multiplexer ("MUX") 43. Since the register addresses for the three link pipe registers in the preferred embodiment are 00, 01 and 10, respectively, two bits in length, counter 51 is also of small-size and identical to counter 47, earlier described. Translator 41 comprises ordinary logic gates that translate the two bit address into a 1 of 3 code for application to the selector input of MUX 43.

MUX 43 is a large sized multiplexer of standard design. The multiplexer contains a sufficient number of input channels to individually handle the number of registers that form the link pipe. In this embodiment, the MUX contains three input channels, 43-1, 43-2 and 43-3; and each of those input channels is sufficient in size to couple the bits of an address stored in a link pipe register, 24-bits, as example, to the output channel. The individual input channels of the MUX are respectively coupled to the output, O, of an associated one of link pipe registers 30–32. The particular channel that the MUX "gates" through is selected by the code at its input 43a. As shown by the diagram, that code originates in tail control register 39.

When the processor is initialized, the link pipe is also initialized, as later herein described, and the address outputted by counter 51, namely "00", is the address of the "0" register, link pipe register 30. That output address is translated by translator 41 and applied to the selection input 43a of MUX 43. In turn MUX 43 selects the first channel and gates through that channel as output data to output bus 34. The data (address) that appears at the output of link pipe register 30 may then be read by the processor. Via one of the three MUX channels, counter 51 "points to" link pipe register 30. Thus, when the processor applies a read strobe (at line RS) to the RS input of link pipe registers 30, 31 and 32 to read a stored target branch address from the link pipe, following such initialization, only link pipe register 30 may be read at that time. The stored 24-bit address in register 30 is thereby applied to data bus 34.

The controls to automatically change the position of (sic "move") the head pointer includes trail edge detector 45 and recirculating counter 47; that corresponding position control for automatically moving the tail pointer includes trail edge detector 49 and recirculating counter 51. Both circuits function the same. The recirculating counters are of standard design. Each control register contains a reset input to permit the counter to be reset, such as occurs on initialization, on application of a voltage from a source external to the link pipe system. By design the counter provides an output of "00" when reset, as on initialization, by application of a reset voltage to the reset input of the counter. Each counter furnishes a count of input pulses, up to a predetermined number of such input pulses, and then resets to zero, beginning the count anew, referred to as "recycling". The number of counts by design is set to equal one less than the number of registers in the link pipe so that the first register of the link pipe is the "0" position. Thus each counter normally provides a binary output of "00", and then produces binary counts of "01" and "10" as each of two input pulses is input in sequence, representing a count of two. With the next input pulse (a third), the counter recycles and again outputs binary "00".

In operation, when the processor is to store (WRITE) a first branch address, the processor applies the address as data over bus 33 and applies a write strobe to WS, a voltage pulse. Being initialized, the circuits of the link pipe system, as above described, enable the E input of register 30 (the "0" register) and register 30 receives the WRITE. When the write strobe pulse terminates, the trailing edge of that pulse is detected by trailing edge detector 45. In turn detector 45 supplies a pulse to the input of counter 47, which thereby increments the count from "00" to "01", the address of the next register in the series of registers that form the link pipe. Now outputting a branch address for the second link pipe register 31, the register address is translated by address translator 37 into the one of the three output lines connected to register 31. The translator applies a voltage high to selection line 37b, and that voltage is applied to the E input of register 31, preparing the register to receive the next write.

Although register 31 is enabled to receive an input, at this time no data is present on bus 33 and the necessary write strobe is absent at input WS. Thus register 31 cannot at this stage receive a write of data. The register is, however, prepared to receive a WRITE on the next write by the processor (via bus 33 and write strobe WS) at such time as the processor is to store another branch address.

Assuming the processor is to store a second branch address, the processor applies the second branch address on bus 33 and applies a write strobe to input WS. As above described only register 31 is able to receive a WRITE, since that register is the only one selected by address translator 37. The first address earlier written by the processor into the link pipe remains stored in link pipe register 30. In the same manner that was earlier described, the second address is then written into register 31. The trailing edge of the WRITE strobe pulse is again detected at trail edge detector 45, which again supplies an input pulse to counter 47 thereby, in turn, incrementing the count from "01" to "10". The value is received and translated by address translator 37 which in turn selects selection line 37c. With a voltage high applied to selection line 37c, the E input to the third register of the link pipe, register 32, is enabled and the register is prepared to receive a third branch address in the same manner earlier described for the prior link pipe register when and if the processor is to store a third branch address.

The foregoing paragraphs described the manner in which the head pointer, described in connection with the operational diagram of FIG. 1, is automatically pointed to the next link pipe register in the link pipe when a branch address is written to the link pipe system. The automatic change of position of the tail pointer circuit is next considered. Trail edge detector 49 and recirculating counter 51 are identical to detector 45 and counter 47, respectively. In operation, when the processor is to read an address from the link pipe, the processor applies a READ strobe, a voltage pulse, to RS. Being initialized, the circuits of the link pipe system, as above described, via counter 51, translator 41 and MUX 43, the output of register 30 (the "0" register) is available for the read operation. As described in the preceding operation of the address write, the first branch address was written to register 30. When the read strobe is applied by the processor, the strobe pulse is distributed to the RS input of all the link pipe registers. However, since only the first channel 43-1 of the MUX is gated through to data bus 33, only the address stored in register 30 may be read, that is, is applied to bus 33 to be read by the processor.

When the READ strobe pulse is completed, the trailing edge of that pulse is detected by trailing edge detector 49. In turn detector 49 supplies a pulse to the input of counter 51, which increments the count from "00"(the count at initialization) to "01", which is output from the counter. That is the address for the second link pipe register 31. Receiving that count, address translator 41 changes the output selection code to selector input 43a of MUX 43 to that for the second channel 43-2, associated with the second register 31. Hence, the digital information stored in the second register 31 of the link pipe, the second branch address, is ready to be read. Although ready, that address cannot be supplied to data bus 33 at this stage because the read strobe input was earlier terminated and no read strobe is present at the RS input of the link pipe register. The register is, however, prepared to output when the next read strobe RS is applied at such time as the processor is read another branch address. In essence, following one read operation, the tail pointer is automatically advanced up to the next register of the link pipe in preparation for the next read operation.

As earlier described, a second branch address was written into the second register 31 (register "1"), and the head pointer circuit was advanced to point to the third register 32 (register "2"). In the foregoing description, the first address was read from register 31, the tail pointer was automatically moved to point to the second register 31 (register "1"). Assuming the processor next determines to read a second branch address, the processor applies a strobe pulse to RS and opens the read gates, not illustrated, to data bus 33. The read strobe is applied to the RS input of link pipe register 31 (selected by MUX 43) and the address in that register is gated by the MUX onto data output bus 34, whereupon the data is read by the processor. On the completion of the read strobe, trailing edge detector 49 detects the trailing edge of the read strobe pulse, and outputs a pulse to recirculating counter 51. In the same manner as described for the first read, counter 51 is updated with the "10" address of the third link pipe register 32; and, via address translator 41, the selection code for the third channel 43-3 of MUX 43 is applied to the MUX selection input. Register 32 is then prepared for the next read operation. Effectively, the tail pointer now points to the third link pipe register.

The foregoing described operation in which two branch addresses were written and then read. The operation completed with both the head pointer circuit and the tail pointer circuit each pointing to the third register 32 (or "2") of the link pipe system (sic both recirculating counters 47 and 51 output "10"). Assume next that the processor subsequently is to write two branch addresses of another branch instruction (and then follow with a READ of those addresses). In accordance with the foregoing description, it should be understood that on the first write, the first branch address is written into the third link pipe register 32, and, on completion of that write, recirculating counter 47 increments to "00", effectively recycling the counter, thereby preparing the first register 30 to receive the next write of an address. Then the write of the second of the two branch addresses is written by the processor into the first link pipe register 30, the counter 47 increments to "01", thereby preparing ("pointing to") the second register 31 to receive the next write of an address (a third address should that occur).

The same effective circular pointer action is seen to occur for the tail pointer circuit when additional address "reads" are made. The next read by the processor is from register 32 ("2") where the tail pointer circuit was last pointing (ie. counter 51 (at "10"), address translator 41, MUX 43 and input channel 43-3). At the conclusion of that read, trail edge detector 49 provides the pulse which increments counter 51 to "00", recycling the counter. Counter 51 and address translator 41 select the first input channel 43-1 of MUX 43 to prepare register 30 ("0") to respond to the next address "read" by the processor. When the second of the two reads is initiated, strobe RS strobes register 30, the selected register, and the content of that register is gated through MUX 43 onto data bus 34. At the conclusion of the read, trailing edge detector 49 detects the termination of the read strobe, and increments counter 51, which in turn advances the count to "01" the second register 31 of the link pipe. Through address translator 41 the MUX is then set to pass the content of register 31 to output bus 34, should an additional read next be undertaken by the processor.

Effectively, the movement of the head pointer progresses in a circle about the registers of the link pipe as each WRITE operation occurs. So too the tail pointer advances in a circle about those registers as each READ operation occurs. As long as the processor is operating, there is no need to reset or reinitialize the link pipe system. Thus the "base line" or initial position for writes of addresses (and reads) may be located at any register along the link pipe.

Initialization of the link pipe system was assumed in the foregoing description of operation. Each recirculating counter 47 and 51 is of standard construction, which includes a reset input, RESET. When a voltage high is applied to the RESET input, the counter resets and outputs "00", the address of the first register 30 of the link pipe system. To initialize the link pipe system, the processor need only apply a voltage high at input RESET of the circuit. When during initialization, the processor is to initialize the circuit, the processor logic is established in the conventional manner to apply a voltage high at the reset input.

As those skilled in the art will appreciate from the foregoing embodiment, the particular circuit is exemplary and other equivalent circuits and/or components may be substituted to carry out the functions of the link pipe system.

In the foregoing embodiment, the link pipe contained three registers, which is a preferred compromise. In drafting instructions for processing using the processor with the foregoing link pipe system, the software engineer is proscribed by the "rules" for the processor from assigning a sequence of target addresses to the link pipe system (ie. writing to LPHEAD) that exceeds three. Should the software engineer fail to follow that rule and cause a greater number to be written, then one of the later branch target addresses will overwrite an earlier one, with adverse consequences to the processing speed.

As those skilled in the art appreciate, the link pipe may contain additional registers, for example N registers, where N is any number (and the software engineer proscribed from specifying use of the link pipe for a sequence of target addresses greater than N). However, if the maximum number of branch addresses that is required by a sequence of indirect branch instruction is known to be about three, with occasionally, a few sequences of indirect branch instructions that may require four target addresses, then three registers would appear to be the optimum from the standpoint of processor efficiency.

Hardware, like the link pipe requires electrical power on a continuous basis. If the storage of four branch addresses occurs infrequently, the prudent choice is to allow the later branch instructions to be handled by the slower procedure of the prior art (ie. the procedure that produces the branch bubbles), than to waste electrical power, particularly in those instances where the processor part of a portable computer that relies upon battery power.

In the foregoing embodiment the software engineer is proscribed by the programming rules from allowing a sequence of target addresses greater than the number of slots or spaces in the link pipe from being written to the link pipe. In still other embodiments of the invention, the processor system may be modified so as to generate an exception, should the number of target addresses that is sought to be written (prior to being read) exceeds the number of those slots or spaces in the link pipe.

As those skilled in the art understand from the foregoing description, although the described link pipe system was described in connection with a sequence of indirect branch instructions that require a corresponding sequence of branch ("target") addresses, the system may also be used, if desired, to store branch addresses for all indirect branch instructions, including a code sequence which contains only a single indirect branch instruction. However, in the later situation, it is recognized that there is no speed gain in processing a program. Since there is but a single indirect branch instruction, and since the speed of processing is enhanced by overlapping two or more of such indirect branch instructions that are not separated by an intervening non-indirect branch instruction, there would be no advantage to use of the link pipe in the cited instance.

As those skilled in the art appreciate a direct branch instruction will include within the instruction a branch address to which address the processor must be directed, that is, branch, for execution of an instruction. The present invention is not concerned with the branch address of those instructions. Further another branch instruction is known in which the instruction may contain a number of different addresses to which the branch may be taken and a branch is made to a selected one of those addresses for execution in dependence on the outcome of a condition. Although, such instruction is in a sense indirect, and a plurality of branch addresses are necessary for the instruction, this invention also does not relate to those instructions. This invention relates only to indirect branch instructions, and to one or more of such instructions in sequence. Thus when even if a reference is made herein to a branch or branch instruction, it should be understood, that the reference is being made to an indirect branch instruction of the foregoing type.

It is realized that the invention is incorporated within the architecture of a digital processor and constitutes a part of the processor. As is apparent from the foregoing description and in the claims which follow, the term processor as used herein is intended to mean the known elements of a digital processor, external to the present invention. Thus all of the conventional elements of a digital processor for execution of instructions, reading operations and writing operations, and the functions thereof, which are previously known and need not be described in detail, serve as the external environment in which the present invention and the operation thereof are described. Thus the term processor has been referred to in both the preceding description and in the claims that follow only to place the present invention in a proper context so that the function served by the invention as part of the processor is more easily understood.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. In combination with a digital processor, an indirect branch address storage and retrieval system for said digital processor, said digital processor for processing a computer program, including execution of instructions of the computer program, at least some of said instructions including indirect branch instructions and the determination of indirect branch addresses to which an indirect branch instruction is to branch for execution by said digital processor, comprising:

data bus means for conveying an indirect branch address applied by said digital processor for use in a WRITE operation by said digital processor and for conveying indirect branch addresses for use in a READ operation by said digital processor;

register means for storing indirect branch addresses for subsequent output on an immediate first-in first-out basis, said register means including an input, an output and a plurality of registers, each of said registers being sufficient in size to store a single indirect branch address, whereby said register means is capable of storing a plurality of indirect branch addresses equal in number to said plurality of registers;

first means coupling said data bus means to said input of said register means for propagating a indirect branch address on said data bus means for storage in said register means in response to a WRITE operation by said digital processor, whereby a plurality of indirect branch addresses applied to said data bus means by said digital processor in a serial order may be stored concurrently in said register means when said digital processor asserts a WRITE operation for each of said plurality of indirect branch addresses;

second means coupling said data bus means to said output of said register means for propagating an indirect branch address from said register means to said data bus means in response to a READ operation by said digital processor, each READ operation asserted by said digital processor producing an output of the next indirect branch address stored in said register means, whereby indirect branch addresses first inputted into said register are outputted first from said register means.

2. The indirect branch address storage and retrieval system as defined in claim 1, wherein said first coupling means comprises:

a first sequencing circuit for directing said input of said register means to an individual one of said registers, whereby said indirect branch address is written to said individual one of said registers in response to a WRITE operation for said indirect branch address by said digital processor, said first sequencing circuit being responsive to completion of said WRITE operation for automatically directing said input of said register means to the next one of said registers on the next WRITE of an indirect branch address by said processor, whereby each WRITE operation produces a change in direction of said input of said register means from one to a next one of said registers of said plurality of registers, and for recycling through said registers as the number of WRITE operations exceeds the number of registers in said register means; and wherein said second coupling means comprises:

a second sequencing circuit for directing said output of said register means to an output of an individual one of said registers, whereby said indirect branch address READ in response to a READ operation by said digital processor is taken from said individual one of said registers, said second sequencing circuit being responsive to completion of said READ operation for alternatively directing said output of said register means to the output of the next one of said registers, whereby each READ operation produces a change in direction of said output of said register means from the output of one to the output of the next one of said plurality of registers, and for recycling through said registers as the number of READ operations exceeds the number of registers in said register means.

3. The indirect branch address storage and retrieval system as defined in claim 2, wherein said second sequencing circuit further comprises:

a multiplexer;

said multiplexer having an output channel and a plurality of input channels equal in number to said plurality of registers;

each of said plurality of registers having an output coupled to a respective one of said plurality of input channels of said multiplexer;

said multiplexer having a channel selector input, said multiplexer being responsive to a selector code applied to said channel selector input for selecting a particular one of said plurality of channels to output through said output channel.

4. The indirect branch address storage and retrieval system as defined in claim 3, wherein said second sequencing circuit further comprises:

a recycling counter for providing a count of input pulses, said recycling counter recycling to zero on attaining a predetermined count and on each multiple of said predetermined count, said predetermined count being equal in number to one less than the number of registers in said plurality of registers in said register means.

5. The indirect branch address storage and retrieval system as defined in claim 4, wherein said plurality of registers of said register means comprises three.

6. The indirect branch address storage and retrieval system as defined in claim 4, wherein said first sequencing circuit further comprises:

a recycling counter for providing a count of input pulses, said recycling counter recycling to zero on attaining a predetermined count and on each multiple of said predetermined count, said predetermined count being equal in number to one less than the number of registers in said plurality of registers in said register means.

7. The indirect branch address storage and retrieval system as defined in claim 1, wherein said data bus means further comprises:

a first data bus for conveying indirect branch addresses to said register means; and a second data bus for conveying indirect branch addresses from said register means.

8. A computer processor implemented method of storing and retrieving indirect branch addresses of a sequence of indirect branch instructions comprising the steps of:

pointing to a respective register in an ordered series of registers for storage of indirect branch addresses when a first indirect branch address is to be stored for use in the execution of an indirect branch instruction;

pointing to the following registers in said ordered series of registers in sequence when the processor is to store additional indirect branch addresses for use in the execution of additional indirect branch instructions;

pointing to said respective register in said ordered series of registers for retrieval of an indirect branch address when the processor is to read an indirect branch address for execution of an indirect branch instruction;

pointing to the following registers in said ordered series of registers in sequence for sequential retrieval of said additional indirect branch addresses when the processor is to read each additional indirect branch address for execution of additional indirect branch instructions.

9. In a digital processor, apparatus for storing and retrieving indirect branch addresses for use in processor execution of a sequence of indirect branch instructions, comprising:

storage means for storing a plurality of indirect branch addresses on a first in, first out basis, said indirect branch addresses being supplied to said first means by said processor in a sequence;

said processor means for writing indirect branch addresses to said storage means and for reading indirect branch addresses from said storage means.

10. The apparatus defined in claim 9 wherein said storage means comprises:

a series of registers for storage of indirect branch addresses;

a first pointer for directing said processor to one of said registers in said series of registers to direct said processor to said one register for the WRITE of an indirect branch address, and responsive to each said WRITE of an indirect branch address for pointing to the next one of said registers in said series of registers, whereby a sequence of indirect branch addresses is written by said processor in a like sequence of said registers of said series of registers; and a second pointer for directing said processor to one of said registers in said series of registers to direct said processor to said one register for the READ of an indirect branch address, and responsive to each said READ of an indirect branch address for pointing to the next one of said registers in said series of registers, whereby a sequence of indirect branch addresses is read by said processor in a like sequence of said registers of said series of registers.

11. The apparatus as defined in claim 10, wherein each of said first and second pointers recycle through said series of registers when the respective number of WRITES and READS taken by said processor exceeds in number the number of registers in said series of registers.

12. The apparatus as defined in claim 11, wherein said first pointer further comprises: a first recyclable counter for counting events, and wherein said second pointer further comprises: a second recyclable counter; each of said first and second counters for providing a maximum count of events being counted that is equal in number to one less than the number of registers in said series of registers, and in each instance in which said events being counted exceeds said maximum count for resetting to zero to commence recounting additional occurrences of said events from zero.

13. The apparatus as defined in claim 12, wherein said number of registers in said series of registers comprises the number three.

14. The apparatus as defined in claim 12, wherein said events being counted by said first recyclable counter comprises the WRITES taken by said processor; and wherein said events being counted by said second recyclable counter comprises the READS taken by said processor.

15. The apparatus as defined in claim 9, wherein said processor means also includes means for branching to the indirect branch address read from said storage means.

16. A method of increasing the speed of processing of a sequence of Y indirect branch instructions in a pipelined digital processor, where Y is a whole number no larger than the whole number X, comprising the steps of:

writing the indirect branch target addresses of each of said Y indirect branch instructions in sequence to a first location address; and reading said indirect branch target addresses of each of said Y indirect branch instructions from a second location address in sequence, said sequence of reading being the same as said sequence of writing.

17. The method as defined in claim 16, where X is equal to three.

18. A method of increasing the processing speed of a sequence of indirect branch instructions in a pipelined digital processor, comprising the steps of:

writing the indirect branch target addresses of each of N indirect branch instructions in sequence to a first location address to accumulate 1 through N target addresses, said N being a whole number less than the number Y;

reading A indirect branch target addresses from a second location address in sequence, where A is a whole number less than N, and for each of said A indirect branch target addresses, jumping to the addresses specified by the indirect branch target addresses that were read;

writing the indirect branch target addresses of B additional indirect branch instructions in sequence to said first location address, wherein B is any whole number less than (Y−(N−A)); and reading C indirect branch target addresses from said second location address, where C is a whole number equal to or less than ((Y−(N−A))+B), and for each of said C indirect branch target addresses, jumping to the address specified by the indirect branch target address that was read.

19. The method of increasing the speed of processing of a sequence of indirect branch instructions in a pipelined digital processor as recited in claim 18, comprising the steps of:

overlapping each of said indirect branch instructions of said sequence within said pipeline; and supplying respective indirect branch target addresses for said indirect branch instructions in sequence.

* * * * *